(12) United States Patent
Scott et al.

(10) Patent No.: US 7,668,123 B1
(45) Date of Patent: Feb. 23, 2010

(54) NETWORK ACCESS DEVICE LOCATION

(75) Inventors: Richard Scott, Balgownie (AU); Arvind Satyam, Mount Kuring-gai (AU)

(73) Assignee: Nortel Networks Limited, St. Laurent, Quebec (CA)

( * ) Notice: Subject to any disclaimer, the term of this patent is extended or adjusted under 35 U.S.C. 154(b) by 921 days.

(21) Appl. No.: 10/185,096

(22) Filed: Jun. 28, 2002

(51) Int. Cl.
*H04B 7/00* (2006.01)
(52) U.S. Cl. .................................... 370/310; 455/456.1
(58) Field of Classification Search .................. None
See application file for complete search history.

(56) References Cited

U.S. PATENT DOCUMENTS

| | | | | |
|---|---|---|---|---|
| 5,095,500 A * | 3/1992 | Tayloe et al. | ............ | 379/32.01 |
| 5,327,144 A * | 7/1994 | Stilp et al. | ............ | 342/387 |
| 5,513,243 A * | 4/1996 | Kage | ............ | 455/456.4 |
| 6,212,391 B1 * | 4/2001 | Saleh et al. | ............ | 455/456.4 |
| 6,343,317 B1 * | 1/2002 | Glorikian | ............ | 709/218 |
| 6,795,710 B1 * | 9/2004 | Creemer | ............ | 455/456.3 |
| 6,854,072 B1 * | 2/2005 | Cagle et al. | ............ | 714/15 |
| 6,928,059 B1 * | 8/2005 | Valentine et al. | ............ | 370/255 |
| 6,982,953 B1 * | 1/2006 | Swales | ............ | 370/218 |
| 7,167,470 B2 * | 1/2007 | Bailey et al. | ............ | 370/352 |
| 7,197,556 B1 * | 3/2007 | Short et al. | ............ | 709/224 |
| 7,216,161 B1 * | 5/2007 | Peckham et al. | ............ | 709/224 |
| 7,606,938 B2 * | 10/2009 | Roese et al. | ............ | 709/242 |
| 2003/0133450 A1 * | 7/2003 | Baum | ............ | 370/389 |
| 2003/0165138 A1 * | 9/2003 | Swonk et al. | ............ | 370/392 |
| 2006/0080469 A1 * | 4/2006 | Coward et al. | ............ | 709/250 |

\* cited by examiner

*Primary Examiner*—Chi H Pham
*Assistant Examiner*—Mohammad S Adhami
(74) *Attorney, Agent, or Firm*—Barnes & Thornburg LLP

(57) ABSTRACT

In a network in which a plurality of geographically distributed network access points are connected to a plurality of ports of a network switch, the invention provides a method of determining the location of a network access device within a LAN environment and/or the identity of network access devices or users active at a specified location. The method includes performing one or more SNMP queries on a plurality of ports of said network switch to produce a query output, processing the query output to determine what devices, and thus what users, are active at the different access points of the LAN.

21 Claims, 15 Drawing Sheets

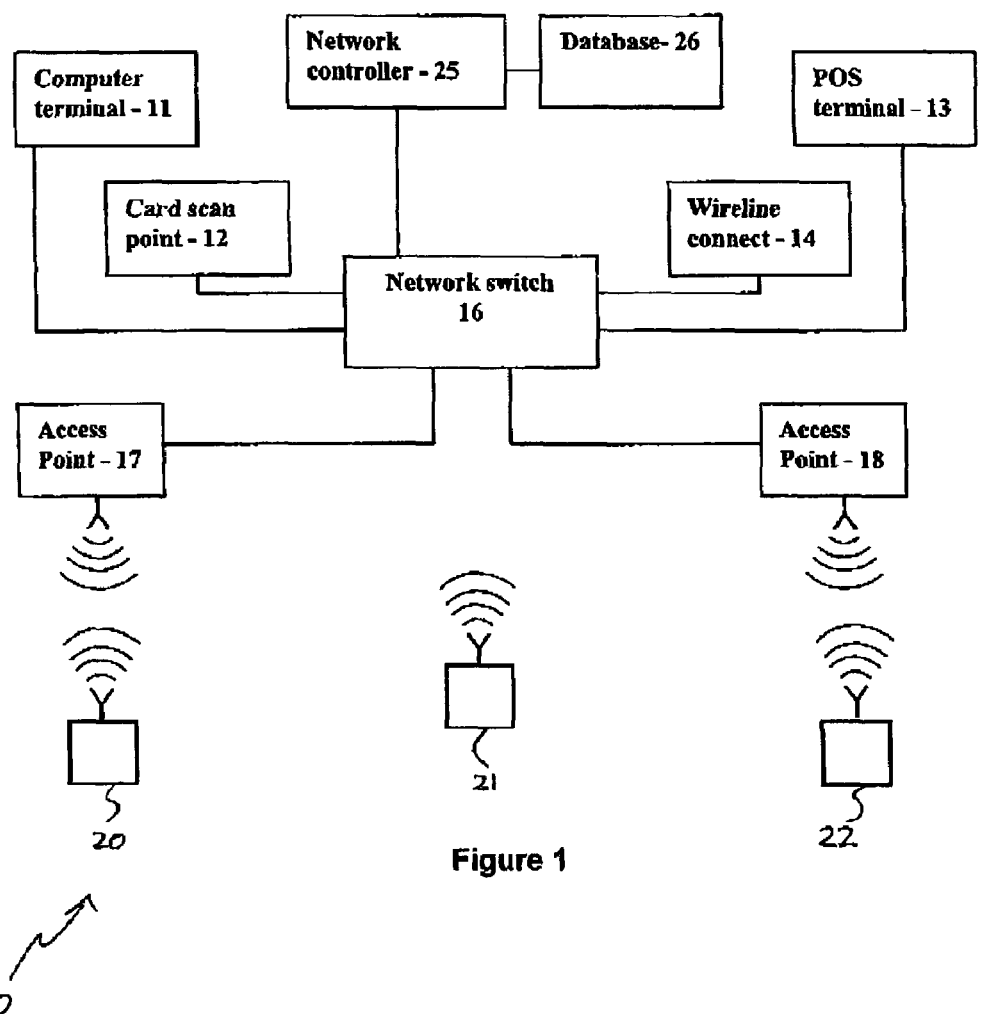
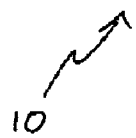
Figure 1

User_Profiles Table

| User ID | Device ID | Device information | User information |
|---------|-----------|--------------------|--------------------|
| Name 1 | xx:xx:xx:xx:xx:01 | Device information 1 | User 1 |
| Name 2 | xx:xx:xx:xx:xx:02 | Device information 2 | User 2 |
|  |  |  |  |
|  |  |  |  |
|  |  |  |  |
|  |  |  |  |
|  |  |  |  |
| Name n | xx:xx:xx:xx:xx:n | Device information n | User n |

Figure 2

| User ID / Device ID | Access Point |
|---|---|
| User 1 | Access Point 'x' |
| User 2 | Access Point 'n' |
| User 3 | Access Point 's' |
|  |  |
|  |  |
|  |  |
| User n | Access Point 'x' |

User_Locations Table

Figure 3

42 Access_Point_Location Table

| Access Point | Type | Location / coverage area | Switch Port No. |
|---|---|---|---|
| a | wireless | Area A | 138 |
| b | wireless | Area B | 142 |
| c | wireline | Area Aa | 156 |
| d | smart card | Area G | 120 |
|  |  |  |  |
|  |  |  |  |
|  |  |  |  |
| zz | point of sale | Area Yy | 88 |

[root@zwolb023 locator]# /usr/local/bin/snmpwalk -Ob 47.181.195.23 public BRIDGE-MIB:dot1dTpFdbAddress | more    S1 dot1dBridge.dot1dTp.dot1dTpFdbTable.dot1dTpFdbEntry.dot1dTpFdbAddress.0.0.94.0.1.1=Hex: 00 00 5E 00 01 01
dot1dBridge.dot1dTp.dot1dTpFdbTable.dot1dTpFdbEntry.dot1dTpFdbAddress.0.0.94.0.1.2=Hex: 00 00 5E 00 01 02
dot1dBridge.dot1dTp.dot1dTpFdbTable.dot1dTpFdbEntry.dot1dTpFdbAddress.0.0.94.0.1.3=Hex: 00 00 5E 00 01 03
dot1dBridge.dot1dTp.dot1dTpFdbTable.dot1dTpFdbEntry.dot1dTpFdbAddress.0.0.94.0.1.4=Hex: 00 00 5E 00 01 04
dot1dBridge.dot1dTp.dot1dTpFdbTable.dot1dTpFdbEntry.dot1dTpFdbAddress.0.0.94.0.1.5=Hex: 00 00 5E 00 01 05
dot1dBridge.dot1dTp.dot1dTpFdbTable.dot1dTpFdbEntry.dot1dTpFdbAddress.0.0.94.0.1.6=Hex: 00 00 5E 00 01 06
dot1dBridge.dot1dTp.dot1dTpFdbTable.dot1dTpFdbEntry.dot1dTpFdbAddress.0.0.94.0.1.7=Hex: 00 00 5E 00 01 07
dot1dBridge.dot1dTp.dot1dTpFdbTable.dot1dTpFdbEntry.dot1dTpFdbAddress.0.0.94.0.1.8=Hex: 00 00 5E 00 01 08
dot1dBridge.dot1dTp.dot1dTpFdbTable.dot1dTpFdbEntry.dot1dTpFdbAddress.0.0.94.0.1.9=Hex: 00 00 5E 00 01 09
dot1dBridge.dot1dTp.dot1dTpFdbTable.dot1dTpFdbEntry.dot1dTpFdbAddress.0.0.94.0.1.10=Hex: 00 00 5E 00 01 0A
dot1dBridge.dot1dTp.dot1dTpFdbTable.dot1dTpFdbEntry.dot1dTpFdbAddress.0.0.117.240.0.220=Hex: 00 00 75 F0 00 DC
dot1dBridge.dot1dTp.dot1dTpFdbTable.dot1dTpFdbEntry.dot1dTpFdbAddress.0.0.117.240.0.221=Hex: 00 00 75 F0 00 DD
dot1dBridge.dot1dTp.dot1dTpFdbTable.dot1dTpFdbEntry.dot1dTpFdbAddress.0.1.2.43.255.226=Hex: 00 01 02 2B FF E2
dot1dBridge.dot1dTp.dot1dTpFdbTable.dot1dTpFdbEntry.dot1dTpFdbAddress.0.1.129.20.70.1=Hex: 00 01 81 14 46 01
dot1dBridge.dot1dTp.dot1dTpFdbTable.dot1dTpFdbEntry.dot1dTpFdbAddress.0.1.175.3.196.73=Hex: 00 01 AF 03 C4 49
dot1dBridge.dot1dTp.dot1dTpFdbTable.dot1dTpFdbEntry.dot1dTpFdbAddress.0.2.179.11.122.135=Hex: 00 02 B3 0B 7A 87
dot1dBridge.dot1dTp.dot1dTpFdbTable.dot1dTpFdbEntry.dot1dTpFdbAddress.0.80.4.205.0.76=Hex: 00 50 04 CD 00 4C
dot1dBridge.dot1dTp.dot1dTpFdbTable.dot1dTpFdbEntry.dot1dTpFdbAddress.0.80.139.208.71.66=Hex: 00 50 8B D0 47 42

Figure 5

50

| | | | | |
|---|---|---|---|---|
| 1. | 00 00 5E 00 01 01 | | 1. | 4096 |
| 2. | 00 00 5E 00 01 02 | | 2. | 4096 |
| 3. | 00 00 5E 00 01 03 | | 3. | 4096 |
| 4. | 00 00 5E 00 01 04 | | 4. | 4096 |
| 5. | 00 00 5E 00 01 05 | | 5. | 4096 |
| 6. | 00 00 5E 00 01 06 | | 6. | 142 |
| 7. | 00 00 5E 00 01 07 | | 7. | 142 |
| 8. | 00 00 5E 00 01 08 | | 8. | 142 |
| 9. | 00 00 5E 00 01 09 | | 9. | 142 |
| 10. | 00 00 5E 00 01 0A | | 10. | 142 |
| 11. | 00 00 75 F0 00 DC | | 11. | 142 |
| 12. | 00 00 75 F0 00 DD | | 12. | 142 |
| 13. | 00 01 02 2B FF E2 | | 13. | 142 |
| 14. | 00 01 81 14 46 01 | | 14. | 142 |
| 15. | 00 01 AF 03 C4 49 | | 15. | 142 |
| 16. | 00 02 B3 0B 7A 87 | | 16. | 142 |
| 17. | 00 50 04 CD 00 4C | | 17. | 138 |
| 18. | 00 50 8B D0 47 42 | | 18. | 142 |

[root@zwolb023 locator]# /usr/local/bin/snmpwalk -Ob 47.181.195.23 public BRIDGE-MIB:dot1dTpFdbPort | more dot1dBridge.dot1dTp.dot1dTpFdbTable.dot1dTpFdbEntry.dot1dTpFdbPort.0.0.94.0.1.1 = 4096
dot1dBridge.dot1dTp.dot1dTpFdbTable.dot1dTpFdbEntry.dot1dTpFdbPort.0.0.94.0.1.2 = 4096
dot1dBridge.dot1dTp.dot1dTpFdbTable.dot1dTpFdbEntry.dot1dTpFdbPort.0.0.94.0.1.3 = 4096
dot1dBridge.dot1dTp.dot1dTpFdbTable.dot1dTpFdbEntry.dot1dTpFdbPort.0.0.94.0.1.4 = 4096
dot1dBridge.dot1dTp.dot1dTpFdbTable.dot1dTpFdbEntry.dot1dTpFdbPort.0.0.94.0.1.5 = 4096
dot1dBridge.dot1dTp.dot1dTpFdbTable.dot1dTpFdbEntry.dot1dTpFdbPort.0.0.94.0.1.6 = 142
dot1dBridge.dot1dTp.dot1dTpFdbTable.dot1dTpFdbEntry.dot1dTpFdbPort.0.0.94.0.1.7 = 142
dot1dBridge.dot1dTp.dot1dTpFdbTable.dot1dTpFdbEntry.dot1dTpFdbPort.0.0.94.0.1.8 = 142
dot1dBridge.dot1dTp.dot1dTpFdbTable.dot1dTpFdbEntry.dot1dTpFdbPort.0.0.94.0.1.9 = 142
dot1dBridge.dot1dTp.dot1dTpFdbTable.dot1dTpFdbEntry.dot1dTpFdbPort.0.0.94.0.1.10 = 142
dot1dBridge.dot1dTp.dot1dTpFdbTable.dot1dTpFdbEntry.dot1dTpFdbPort.0.0.117.240.0.220 = 142
dot1dBridge.dot1dTp.dot1dTpFdbTable.dot1dTpFdbEntry.dot1dTpFdbPort.0.0.117.240.0.221 = 142
dot1dBridge.dot1dTp.dot1dTpFdbTable.dot1dTpFdbEntry.dot1dTpFdbPort.0.1.2.43.255.226 = 142
dot1dBridge.dot1dTp.dot1dTpFdbTable.dot1dTpFdbEntry.dot1dTpFdbPort.0.1.129.20.70.1 = 142
dot1dBridge.dot1dTp.dot1dTpFdbTable.dot1dTpFdbEntry.dot1dTpFdbPort.0.1.175.3.196.73 = 142
dot1dBridge.dot1dTp.dot1dTpFdbTable.dot1dTpFdbEntry.dot1dTpFdbPort.0.1.175.3.196.75 = 142
dot1dBridge.dot1dTp.dot1dTpFdbTable.dot1dTpFdbEntry.dot1dTpFdbPort.0.32.216.3.61.121 = 138
dot1dBridge.dot1dTp.dot1dTpFdbTable.dot1dTpFdbEntry.dot1dTpFdbPort.0.80.4.205.0.76 = 142

Figure 7

| Row | MAC ID | Access Point ID |
|---|---|---|
| 1. | 00 00 5E 00 01 01 | Access Point "aaa" |
| 2 | 00 00 5E 00 01 | Access Point "aaa" |
| 3 | 00 00 5E 00 01 03 | Access Point "aaa" |
| 4 | 00 00 5E 00 01 04 | Access Point "aaa" |
| 5 | 00 00 5E 00 01 05 | Access Point "aaa" |
| 6 | 00 00 5E 00 01 06 | Access point "ggg" |
| 7 | 00 00 5E 00 01 07 | Access point "ggg" |
| 8 | 00 00 5E 00 01 08 | Access point "ggg" |
| 9 | 00 00 5E 00 01 09 | Access point "ggg" |
| 10 | 00 00 5E 00 01 0A | Access point "ggg" |
| 11 | 00 00 75 F0 00 DC | Access point "ggg" |
| 12 | 00 00 75 F0 00 DD | Access point "ggg" |
| 13 | 00 01 02 2B FF E2 | Access point "ggg" |
| 14 | 00 01 81 14 46 01 | Access point "ggg" |
| 15 | 00 01 AF 03 C4 49 | Access point "ggg" |
| 16 | 00 02 B3 0B 7A 87 | Access point "ggg" |
| 17 | 00 50 04 CD 00 4C | Access point "xxx" |
| 18 | 00 50 8B D0 47 42 | Access point "ggg" |

Figure 9

Table dot1dTpFdbAddress

```
***** SNMP QUERY STARTED *****
1: dot1dTpFdbAddress.0.0.94.0.1.1 (octet string) 00.00.5E.00.01.01 (hex)
2: dot1dTpFdbAddress.0.0.94.0.1.2 (octet string) 00.00.5E.00.01.02 (hex)
3: dot1dTpFdbAddress.0.0.94.0.1.6 (octet string) 00.00.5E.00.01.06 (hex)
4: dot1dTpFdbAddress.0.0.94.0.1.7 (octet string) 00.00.5E.00.01.07 (hex)
5: dot1dTpFdbAddress.0.0.94.0.1.8 (octet string) 00.00.5E.00.01.08 (hex)
6: dot1dTpFdbAddress.0.0.94.0.1.9 (octet string) 00.00.5E.00.01.09 (hex)
7: dot1dTpFdbAddress.0.0.94.0.1.10 (octet string) 00.00.5E.00.01.0A (hex)
8: dot1dTpFdbAddress.0.0.117.240.0.220 (octet string) 00.00.75.F0.00.DC (hex)
9: dot1dTpFdbAddress.0.0.117.240.0.221 (octet string) 00.00.75.F0.00.DD (hex)
10: dot1dTpFdbAddress.0.0.162.135.201.224 (octet string) 00.00.A2.87.C9.E0 (hex)
11: dot1dTpFdbAddress.0.1.2.43.255.226 (octet string) 00.01.02.2B.FF.E2 (hex)
12: dot1dTpFdbAddress.0.1.129.20.70.1 (octet string) 00.01.81.14.46.01 (hex)
13: dot1dTpFdbAddress.0.1.175.3.196.75 (octet string) 00.01.AF.03.C4.4B (hex)
14: dot1dTpFdbAddress.0.2.179.11.122.135 (octet string) 00.02.B3.0B.7A.87 (hex)
15: dot1dTpFdbAddress.0.3.71.37.49.200 (octet string) 00.03.47.25.31.C8 (hex)
16: dot1dTpFdbAddress.0.3.75.223.231.128 (octet string) 00.03.4B.DF.E7.80 (hex)
17: dot1dTpFdbAddress.0.3.186.5.57.175 (octet string) 00.03.BA.05.39.AF (hex)
18: dot1dTpFdbAddress.0.3.186.5.225.245 (octet string) 00.03.BA.05.E1.F5 (hex)
19: dot1dTpFdbAddress.0.3.186.11.165.238 (octet string) 00.03.BA.0B.A5.EE (hex)
20: dot1dTpFdbAddress.0.3.186.16.137.194 (octet string) 00.03.BA.10.89.C2 (hex)
21: dot1dTpFdbAddress.0.3.186.17.180.39 (octet string) 00.03.BA.11.B4.27 (hex)
22: dot1dTpFdbAddress.0.4.56.16.14.2 (octet string) 00.04.38.10.0E.02 (hex)
23: dot1dTpFdbAddress.0.5.150.0.176.18 (octet string) 00.05.96.00.B0.12 (hex)
24: dot1dTpFdbAddress.0.6.91.211.250.133 (octet string) 00.06.5B.D3.FA.85 (hex)
25: dot1dTpFdbAddress.0.16.131.122.63.83 (octet string) 00.10.83.7A.3F.53 (hex)
26: dot1dTpFdbAddress.0.16.131.207.216.204 (octet string) 00.10.83.CF.D8.CC (hex)
27: dot1dTpFdbAddress.0.16.131.255.120.158 (octet string) 00.10.83.FF.78.9E (hex)
28: dot1dTpFdbAddress.0.32.216.3.24.14 (octet string) 00.20.D8.03.18.0E (hex)
29: dot1dTpFdbAddress.0.32.216.3.61.121 (octet string) 00.20.D8.03.3D.79 (hex)
30: dot1dTpFdbAddress.0.80.4.205.0.76 (octet string) 00.50.04.CD.00.4C (hex)

***** SNMP QUERY FINISHED *****
```

Table dot1dTpFdbPort

```
***** SNMP QUERY STARTED *****
1: dot1dTpFdbPort.0.0.94.0.1.1 (integer) 588
2: dot1dTpFdbPort.0.0.94.0.1.2 (integer) 588
3: dot1dTpFdbPort.0.0.94.0.1.6 (integer) 142
4: dot1dTpFdbPort.0.0.94.0.1.7 (integer) 142
5: dot1dTpFdbPort.0.0.94.0.1.8 (integer) 142
6: dot1dTpFdbPort.0.0.94.0.1.9 (integer) 142
7: dot1dTpFdbPort.0.0.94.0.1.10 (integer) 142
8: dot1dTpFdbPort.0.0.117.240.0.220 (integer) 142
9: dot1dTpFdbPort.0.0.117.240.0.221 (integer) 142
10: dot1dTpFdbPort.0.0.162.135.201.224 (integer) 142
11: dot1dTpFdbPort.0.1.2.43.255.226 (integer) 142
12: dot1dTpFdbPort.0.1.129.20.70.1 (integer) 142
13: dot1dTpFdbPort.0.1.175.3.196.75 (integer) 142
14: dot1dTpFdbPort.0.2.179.11.122.135 (integer) 142
15: dot1dTpFdbPort.0.3.71.37.49.200 (integer) 142
16: dot1dTpFdbPort.0.3.75.223.231.128 (integer) 142
17: dot1dTpFdbPort.0.3.186.5.57.175 (integer) 142
18: dot1dTpFdbPort.0.3.186.5.225.245 (integer) 142
19: dot1dTpFdbPort.0.3.186.11.165.238 (integer) 142
20: dot1dTpFdbPort.0.3.186.16.137.194 (integer) 142
21: dot1dTpFdbPort.0.3.186.17.180.39 (integer) 142
22: dot1dTpFdbPort.0.4.56.16.14.2 (integer) 0
23: dot1dTpFdbPort.0.5.150.0.176.18 (integer) 142
24: dot1dTpFdbPort.0.6.91.211.250.133 (integer) 142
25: dot1dTpFdbPort.0.16.131.122.63.83 (integer) 142
26: dot1dTpFdbPort.0.16.131.207.216.204 (integer) 142
27: dot1dTpFdbPort.0.16.131.255.120.158 (integer) 142
28: dot1dTpFdbPort.0.32.216.3.24.14 (integer) 138
29: dot1dTpFdbPort.0.32.216.3.61.121 (integer) 138
30: dot1dTpFdbPort.0.80.4.205.0.76 (integer) 142
***** SNMP QUERY FINISHED *****
```

Figure 13

| | | |
|---|---|---|
| 1: | 00.00.5E.00.01.01 | Access Point "aa" |
| 2: | 00.00.5E.00.01.02 | Access Point "aa" |
| 3: | 00.00.5E.00.01.06 | Access Point "bb" |
| 4: | 00.00.5E.00.01.07 | Access Point "bb" |
| 5: | 00.00.5E.00.01.08 | Access Point "bb" |
| 6: | 00.00.5E.00.01.09 | Access Point "bb" |
| 7: | 00.00.5E.00.01.0A | Access Point "bb" |
| 8: | 00.00.75.F0.00.DC | Access Point "bb" |
| 9: | 00.00.75.F0.00.DD | Access Point "bb" |
| 10: | 00.00.A2.87.C9.E0 | Access Point "bb" |
| 11: | 00.01.02.2B.FF.E2 | Access Point "bb" |
| 12: | 00.01.81.14.46.01) | Access Point "bb" |
| 13: | 00.01.AF.03.C4.4B | Access Point "bb" |
| 14: | 00.02.B3.0B.7A.87 | Access Point "bb" |
| 15: | 00.03.47.25.31.C8 | Access Point "bb" |
| 16: | 00.03.4B.DF.E7.80 | Access Point "bb" |
| 17: | 00.03.BA.05.39.AF | Access Point "bb" |
| 18: | 00.03.BA.05.E1.F5 | Access Point "bb" |
| 19: | 00.03.BA.0B.A5.EE ) | Access Point "bb" |
| 20: | 00.03.BA.10.89.C2 | Access Point "bb" |
| 21: | 00.03.BA.11.B4.27 | Access Point "bb" |
| 22: | 00.04.38.10.0E.02 | Access Point "bb" |
| 23: | 00.05.96.00.B0.12 | Access Point "bb" |
| 24: | 00.06.5B.D3.FA.85 | Access Point "bb" |
| 25: | 00.10.83.7A.3F.53 | Access Point "bb" |
| 26: | 00.10.83.CF.D8.CC | Access Point "bb" |
| 27: | 00.10.83.FF.78.9E | Access Point "bb" |
| 28: | 00.20.D8.03.18.0E | Access Point "nn" |
| 29: | 00.20.D8.03.3D.79) | Access Point "nn" |
| 30: | 00.50.04.CD.00.4C | Access Point "bb" |

Figure 14

NETWORK ACCESS DEVICE LOCATION

FIELD OF THE INVENTION

This invention relates to determining the geographic location of a network access device within an area network in a network agnostic manner. The invention can be used in a wireline network but has particular relevance in a wireless network such as an indoor Wireless Local Area Network (WLAN) environment.

BACKGROUND OF THE INVENTION

In a network environment, providing proximity based services to a user involves locating users to the nearest access point. By finding the location of devices, whether it be in a wireline or wireless environment from a network standpoint, carriers can provide a whole range of services. Using this framework, carries can allow users to "pull" information from the network as well as "push" information to the network based on a user's current location.

However, to date, there has been difficulty in determining location across a range of network and device types. Location of mobile users via Global Positioning System (GPS) is possible but ineffective in an indoors environment where buildings block GPS transmissions. Access point attachment of mobile devices is another way of determining a mobile user's location, however, this is proprietary in its methods.

One proposed indoor solution is the Microsoft RADAR system. This system uses the RF signal strength in the communications network as an indicator of the distance between a transmitter and a receiver. As a user walks between access points of a WLAN such as in a building, the signal strength varies. The signal received at the device is strongest when the receiver is close to the access point and weakest when the device is far away. A problem with this system is that RF signals scale poorly around walls and other obstructions within a building. RF signal strength is unpredictable in occupied spaces and thus a user may be located close to an access point but the signal strength reading may indicate a far greater distance. Accuracy of the system varies greatly between areas with obstructions and areas without obstructions. The infrastructure of the system, eg RF antennas and the like, greatly adds to the cost of implementing these methods.

A further proposed solution is the AT&T Active BAT system which works by monitoring Ultrasound and RF signals. Wireless devices in the system are tagged by attaching small wireless transmitters. The location of these transmitters is tracked by the receiving elements to determine the location of each wireless device in the building. The BAT system imposes a significant additional infrastructure cost doe to the RF base station, the matrix of receiver elements and wireless transmitters. The time required to build the network is also significant. The network provides little flexibility.

SUMMARY OF THE INVENTION

It is thus an object of the invention to provide the ability to determine the relative location of a network access device, in particular a wireless device, in a network access agnostic manner. More particularly, it is an object of the invention to determine the relative location of a device irrespective of the network provider or the access device used.

In a first aspect of the present invention, there is provided in a network in which a plurality of geographically distributed network access points are connected to a plurality of ports of a network switch, a method of determining the location of a network access device comprising:

performing one or more queries on a plurality of ports of said network switch, said one or more queries producing a query output;

processing said query output to determine a port on which said network access device is active; and determining an approximate location of said network access device from the geographic location of an access point corresponding with said determined port.

Preferably the method further comprises determining a device identity of said network access device, wherein said step of processing said query output determines a port on which said device identity is active. Preferably the device identity is a Medium Access Control (MAC) address.

In a preferred embodiment said one or more queries comprises a first query to determine the network access devices active on said network switch and a second query to determine a port identity, wherein the outputs of said first and second queries are correlated to determine on which port said network access device is active. Preferably said first and second queries are conducted substantially simultaneously.

In a further aspect, there is provided in a network in which a plurality of geographically distributed network access points are connected to a plurality of ports of a network switch, a method of determining the identity of one or more network access devices in proximity to a selected one of said access points, the method comprising:

performing one or more queries on at least a port of said network switch to which said selected access point is connected, said query producing a query output; and processing said query output to determine a device identity of one or more devices active on said network port.

In a preferred embodiment said one or more queries comprises a first query to determine the network access devices active on said network switch and a second query to determine a port identity, wherein the outputs of said first and second queries are correlated to determine the identity of any network access devices active on said selected access point. Preferably said first and second queries are conducted substantially simultaneously.

In a further aspect, the invention provides, in a network in which a plurality of geographically distributed network access points are connected to a plurality of ports of a network switch, a method of determining the location of a user comprising:

determining a device identity of a network access device corresponding to said user;

performing one or more queries on a plurality of ports of said network switch, said one or more queries producing a query output;

processing said query output to determine a port on which said network access device is active; and determining an approximate location of said network access device from the geographic location of the access point corresponding with said determined port; thereby determining an approximate location of said user.

In a further aspect, there is provided, in a network in which a plurality of geographically distributed network access points are connected to a plurality of ports of a network switch, a method of determining the identity of one or more users in proximity to a selected one of said access points, the method comprising:

performing one or more queries on at least a port of said network switch to which said selected access point is connected, said one or more queries producing a query output;

processing said query output to determine a device identity of one or more devices active on said network port; and correlating said determined device identities with device users.

In a preferred embodiment, the one or more queries are a network management query. More preferably, said one or more queries are a Simple Network Management Protocol (SNMP) query.

In a preferred embodiment, a device identity is a universal device identifier such as a Medium Access Control (MAC) address.

In a preferred embodiment, a network database stores a User_Profiles table comprising at least a table of MAC addresses and the user to which a MAC address is assigned.

In a further preferred embodiment, a network database stores a User_Locations table comprising at least a table of user or device locations produced from the network switch queries. The methods of the invention preferably further comprise updating the User_Locations table after a network switch query is performed.

Preferably, the location of a user is determined by mapping the User_Profiles table to the User_Locations table to output the current location of that user.

In a further aspect, there is provided in a network in which a plurality of geographically distributed network access points are connected to a plurality of ports of a network switch, a method of delivering information to one or more users in proximity to a selected one of said access points, said method comprising:

performing one or more queries on at least a port of said network switch to which said selected access point is connected, said query producing a query output;

processing said query output to determine a device identity of one or more devices active on said network port;

correlating said determined device identities with device users; and transmitting information through said network to communications enabled network access devices of said users.

In a preferred embodiment, the method further comprises determining if a user corresponding to a device identity active on said selected port is a subscriber of said information.

In a further aspect, the invention further comprises software for carrying out the method steps of any one or more of the previous aspects.

BRIEF DESCRIPTION OF THE DRAWINGS

Preferred embodiments of the present invention will now be described, by way of example only, with reference to the accompanying figures in which:

FIG. 1 is a schematic illustration of a typical prior art WLAN architecture on which the method of the invention may be performed;

FIG. 2 shows a sample User_Profiles table used in implementing an embodiment of the invention;

FIG. 3 shows a sample User_Locations table used in implementing an embodiment of the invention;

FIG. 5 shows a sample output from an address query to the network switch;

FIG. 7 shows a sample output from a port query to the network switch;

FIG. 9 shows a merged list from the processed lists of FIGS. 6 and 8;

FIG. 11 provides a real example of an output of an address query;

FIG. 12 provides a processed list of the output of FIG. 11;

FIG. 13 provides a Teal example of an output of a port query conducted simultaneously with the address query of FIG. 11;

FIG. 14 provides a merged list of the outputs of FIGS. 12 and 13;

DETAILED DESCRIPTION OF THE EMBODIMENTS

Figure 4:
FIG. 4 shows a sample Access_Point_Location table stored in a network database.

Referring to FIG. 1 there is shown a typical Wireless Local Area Network (WLAN) architecture 10 on which the systems of the present invention may be embodied. The WLAN 10 consists of a series of devices such as computer terminals 11, smart card scan points 12, electronic Point of Sale (POS) terminals 13, wireline device connect points 14 and wireless access points 17,18 interconnected through a network switch 16 (layer 2 switch) to form a hardwired Ethernet type network. Each of the above access points (wireline and wireless) connect to individual ports of the network switch. The WLAN is controlled by a network controller 25 which accesses a network database 26 storing system information.

The wireline and wireless access points are geographically distributed throughout the network area with the physical location and, in the case of wireless access points, the coverage of the access point being known to the network. The geographic distribution information is stored in the network database as an Access_Point_Location table such as shown in FIG. 4. The Access_Point_Location table 40 identifies an access point 41, the type of access point 42, eg wireless, computer terminal, smart card scan point, etc. and the location and coverage of the access point 43 and the port number 44 of the network switch to which the access point is hard wired.

A User_Profiles table is also stored in the database. The User_Profiles table 28 (FIG. 2) stores user profile information including user identification 33, device identities 34 for devices owned by the user, device information 35 and user profile information 36 such as demographic data, service subscription data etc.

Users access the network using network access devices such as mobile phones, handheld web browsers, laptop computers, Personal Digital Assistants (PDA), which are enabled for communication within the LAN environment eg by using a LAN card, and connect to the network through a compatible access point. For example, wireless devices communicate with the network through a wireless access point, etc. As illustrated in FIG. 1, a wireless device will connect to the access point with the strongest signal, which is commonly the nearest geographically located access point, ie wireless device 20 will connect to access point 17, wireless device 22 will connect to access point 18 and wireless device 21 will connect to either of access points 17 or 18 depending on signal strength. Additionally, access to the LAN may also be provided by non-communications devices such as smart cards, POS cards etc. which require co-operation with a compatible terminal or reader.

A user's communications-enabled network access device is identified by a unique Medium Access Control (MAC) address assigned to it. The network database 26 stores MAC addresses for a user in the User_Profiles table described above. A user may have multiple network access devices.

As will be described in greater detail below, the geographic location of users within the LAN environment can be determined. The network database 26 stores user locations in a User_Locations table as shown at 30 in FIG. 3. The User_Locations table 30 comprises a first column 31 providing a list of users and/or device identities, and a second column 32 detailing the location of the respective user from column 1 at a particular point in time. The table 30 is regularly updated and can be used to provide location based services to a user. Examples of such services will be described below.

By monitoring the ports on the network that have access points connected to them (wireless or wireline), the MAC addresses active on each access point can be determined. In accordance with preferred embodiments of the invention. Simple Network Management Protocols (SNMP) can be used to extract information on each port on the network switch 16, though other network diagnostics such as Remote MONitoring (RMON) may be employed. In particular, two Management Information Base (MIB) queries in combination have been found by the present inventors to be the most beneficial in determining user location, namely the BRIDGE-MIB:dot1dTpFdbAddress and BRIDGE-MIB:dot1dTpFdbPort queries.

The BRIDGE-MIB:dot1dTpFdbPort has the form:—
Name: dot1dTpFdbPort
Type: OBJECT-TYPE
OID: 1.3.6.1.2.1.17.4.3.1.2
Full path: iso(1).org(3).dod(6).internet(1).mgmt(2).mib-2(1).dot1Bridge(17).dot1dTp(4).dot1dTpFdbTable(3).dot1dTpFdbEntry(1).dot1dTpFdbPort(2)
Module: BRIDGE-MIB
Parent: dot1dTpFdbEntry
Prev sibling: dot1dTpFdbAddress
Next sibling; dot1dTpFdbStatus
Numerical syntax: Integer (32 bit)
Base syntax: INTEGER
Composed syntax: INTEGER
Status: mandatory
Max access: read-only
Description: Either the value '0', or the port number of the port on which a frame having a source address equal to the value of the corresponding instance of dot1dTpFdbAddress has been seen. A value of '0' indicates that the port number has not been learned but that the bridge does have some forwarding/filtering information about this address (e.g. in the dot1dStaticTable).

The BRIDGE-MIB:dot1dTpFdbAddress has the form:—
Name: dot1dTpFdbAddress
Type: OBJECT-TYPE
OID: 1.3.6.1.2.1.17.4.3.1.1
Full path: iso(1).org(3).dod(6).internet(1).mgmt(2).mib-2(1).dot1dBridge(17).dot1dTp(4).dot1dTpFdbTable(3).dot1dTpFdbEntry(1).dot1dTpFdbAddress(1)
Module: BRIDGE-MIB
Parent: dot1dTpFdbEntry
Next sibling: dot1dTpFdbPort
Numerical syntax: Octets
Base syntax: OCTET STRING
Composed syntax: MacAddress
Status: mandatory
Max access: read-only
Reference: IEEE 802.1D-1990: Section 3.9.1.3.9.2
Description: A unicast MAC address for which the bridge has forwarding and/or filtering Information.

Figure 6:
FIG. 6 shows a processed list of MAC addresses from the output of FIG. 5.

Using a MIB browser, the queries BRIDGE-MIB:dot1dTpFdbAddress and BRIDGE-MIB:dot1dTpFdbPort can be run across the network switch. Referring to FIG. 5, the BRIDGE-MIB:dot1dTpFdbAddress query returns a list 50 which details the MAC addresses 51 active on the switch. The list 50 can be further processed, eg using a UCSD SNMP or CMU SNMP query, to extract the MAC address information from the other peripheral information to produce a processed address list 60 in hexadecimal format as shown in FIG. 6.

Figure 8:
FIG. 8 shows a processed list of port numbers from the output of FIG. 7.

Referring to FIG. 7, there is shown the query output from the BRIDGE-MIB:dot1dTpFdbPort comprising a list 70 of port numbers of the switch. In the query output shown, three distinct port numbers 71, 72, 73 are identified. The list 70 can be processed in a similar manner as described for the BRIDGE MIB address query described above to produce a processed port list 80 consisting only of port identification data. Further processing using the Access_Point_Location table described above as a look-up table can convert the port identities to access point identities as shown in FIG. 8.

The size of each list is dependent on the number of network access devices active on the network at the time the respective query is performed, with each active device providing a separate line of output. Provided that the two queries are run substantially simultaneously, ie one immediately after the other such that the state of the network remains unchanged between the two queries, them will be a one-to-one correlation between the processed lists in FIGS. 6 and 8 such that by mapping one list to the other, ie by merging the two lists, a correlation between access point and MAC address can be obtained. Because the location of the access point within the LAN environment is known, the access point at which a MAC address is active is indicative of the fact that that MAC address, and thus the user, is within the coverage area of that access point. A merged list 90 is shown in FIG. 9.

Once the merged list 90 is obtained, the User_Profiles table can be used as a look-up table to determine the user to which a located device belongs in order to update the User_Locations table.

EXAMPLE

Figure 10:
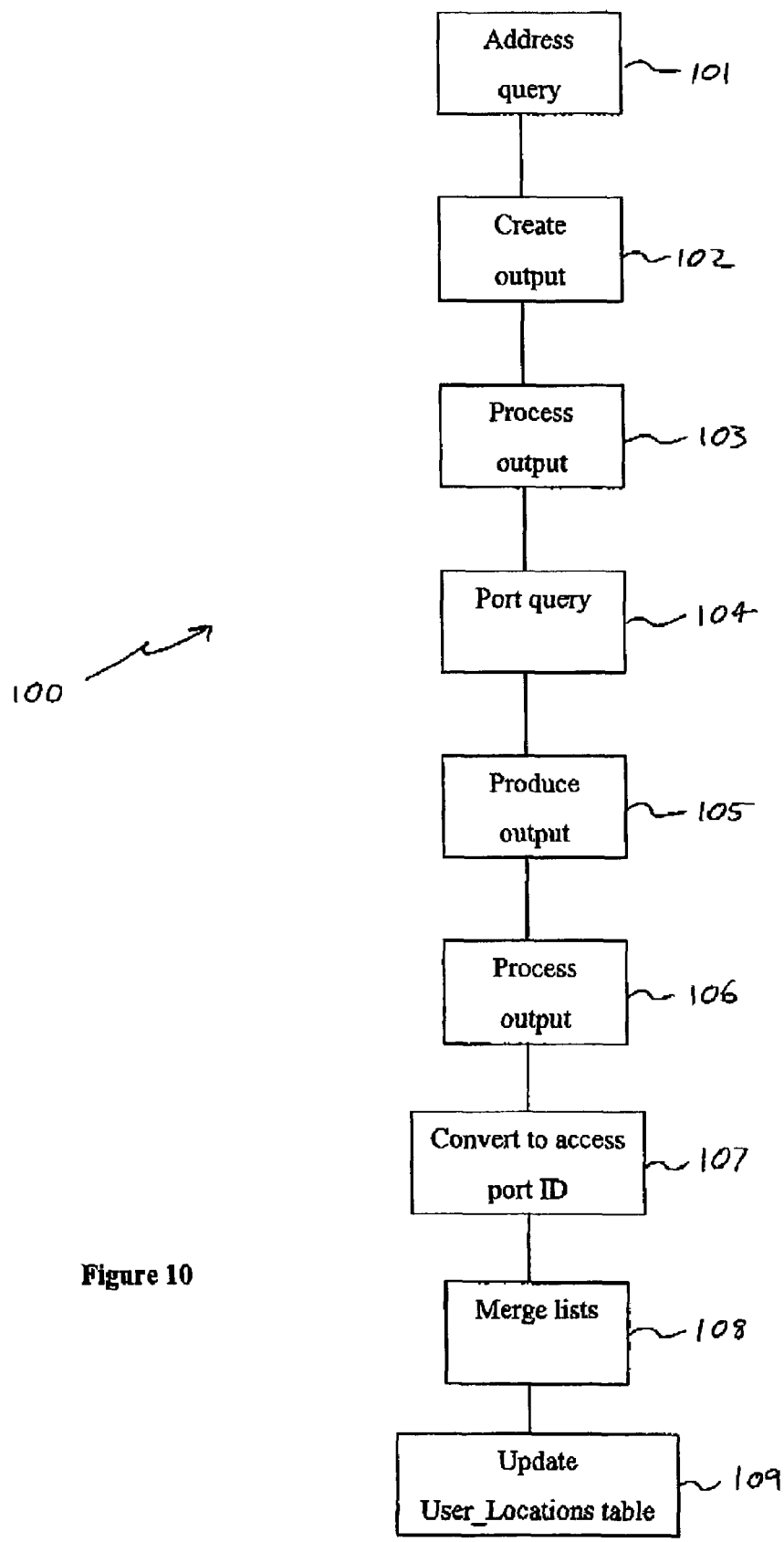
FIG. 10 provides a flowchart of the steps of a method according to a preferred embodiment of the invention.
Figure 12:
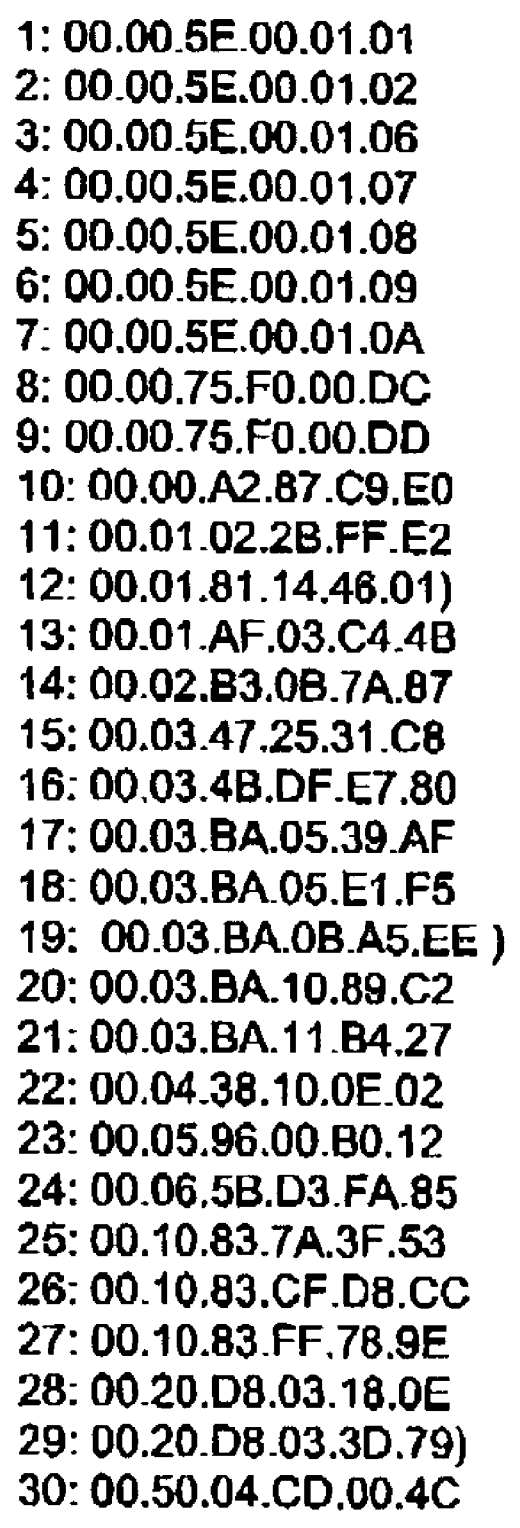

A more specific example will be now described with reference to the flowchart 100 of FIG. 10 and outputs of FIGS. 11 to 14. In the example, a Wireless LAN terminal with MAC address: 00 20 D8 03 18 0E is connected to an access point with MAC address 00 20 D8 03 3D 79. At step 101 an SNMP trace using the Bridge-MIB dot1dTpFdbAddress query, is performed. The query output (FIG. 11) is created as Table:dot1dTpFdbAddress at step 102 and processed 103 to create a processed list of MAC addresses (FIG. 12). Simultaneously, a BRIDGE-MIB:dot1dTpFdbPort query is conducted 104 to produce an output 105 Table:dot1dTpFdbPort (FIG. 13) which is further processed at 106 to extract the port identification data. Since Table:dot1dTpFdbAddress and Table:dot1dTpFdbPort have a one-to-one correlation at a point in time, a row entry of one table correlates with the same row entry of the other table and therefore, after converting the port numbers 107 to access point identities, the two lists can be merged 108. A merged list is shown in FIG. 14.

At step 109, the User_Profiles table is used as a look-up table to update the User_Locations table.

In the above example, the MAC address 00 20 D8 03 18 0E has a point of presence at row 28 as seen in Table: dot1dTpFdbAddress (FIG. 11). Referring to Table: dot1dTpFdbPort (FIG. 13) we see that row 28 provides port number 138 from which the access point, and the geographic coverage of that access point can be determined thus providing an indication of the location of the network access device with that MAC address.

It should be noted that the same process can be conducted to determine the MAC address for the access point, which appears in the tables of FIGS. 11 to 13 on row 29.

The merged list of FIG. 14 may be used in two predominant ways. The data may be used to update the User_Locations table in the manner described such that the location of a user may be quickly determined using the User_Locations table as a look-up reference.

Secondly, the merged list provides all the users active at a particular access point. Location based services may thus be provided to all of those users in a geographic area covered by that access point. As seen in the above described example, Table:dot1dTpFdbPort (FIG. 13) indicates that the port number "142" has a point of presence at rows 3-21, 23-27 and 30. The corresponding rows in Table:dot1dTpFdbAddress (FIG. 12) provide the MAC addresses of the network access devices active on that port number.

For highly mobile users, their MAC address may register at more than one access point. To determine this user's location, mapping is conducted for multiple time spaced SNMP queries and a user's location determined from the persistence of their address at any one location. A high persistence at one access point over several queries is a strong indication that the user is in the vicinity of that access point.

By maintaining an updated list of user locations within the LAN environment end users and service providers can both PUSH and PULL information to and from the network. An example of a PUSH service is when a network provider sends advertisements to the mobile user when the mobile user enters a shopping centre, or a particular area of a shopping centre. The advertisements may relate to shops or services nearby. This type of service may be provided concurrently to all users at an access point.

An example of a PULL service is where a mobile user determines their location on a campus map, ie the user is pulling their relative location from the network.

Further examples of proximity based services include:—

1) Find a friend/colleague—this requires knowing the identity of two users and mapping the relative locations of each of them.

2) Locating services—for example in a University campus environment students can determine their current location relative to the campus map, the student can further be provided with directions to a place they need to be.

3) Localised news service—this service can used to broadcast information specific to a location, for example the last drinks call at the bar, or a notice that a meeting/seminar etc is about to start in given lecture hall.

4) Locating lost equipment—provided that a misplaced network access device remains connected to the network, a service can be provided to locate the misplaced device.

5) Panic button—this application can be run when the user feels that he/she is in danger and security should be alerted. The user invokes the application through the network access device which informs security of the location of the user and can track the user's movements.

6) Waiting lists—eg for a doctor. In this application, a user can register to see a doctor and then the user is notified when the waiting queue is short, relative to the user's position. For example, if the access point to which the user is connected is located a long way from the doctor's surgery, the user may be notified when there are three patients in the queue, or if the user is located closer, the user may be notified when only one patient is in the queue.

The advantage in determining not only the location of the devices connected to the network, but the users of those devices is that other user data, eg demographic data, can be used to determined the types of location dependent information that is pushed to the user. For example, a network switch query can determine all users in proximity to an access point such that a location based PUSH service, eg an advertisement for a shop within the geographic area of that access point, can be provided to those users. Before that service is provided, the User_Profiles table is accessed to determine whether the located users are subscribers to that particular PUSH service, such that only subscribers receive the service.

Figures 15, 16:
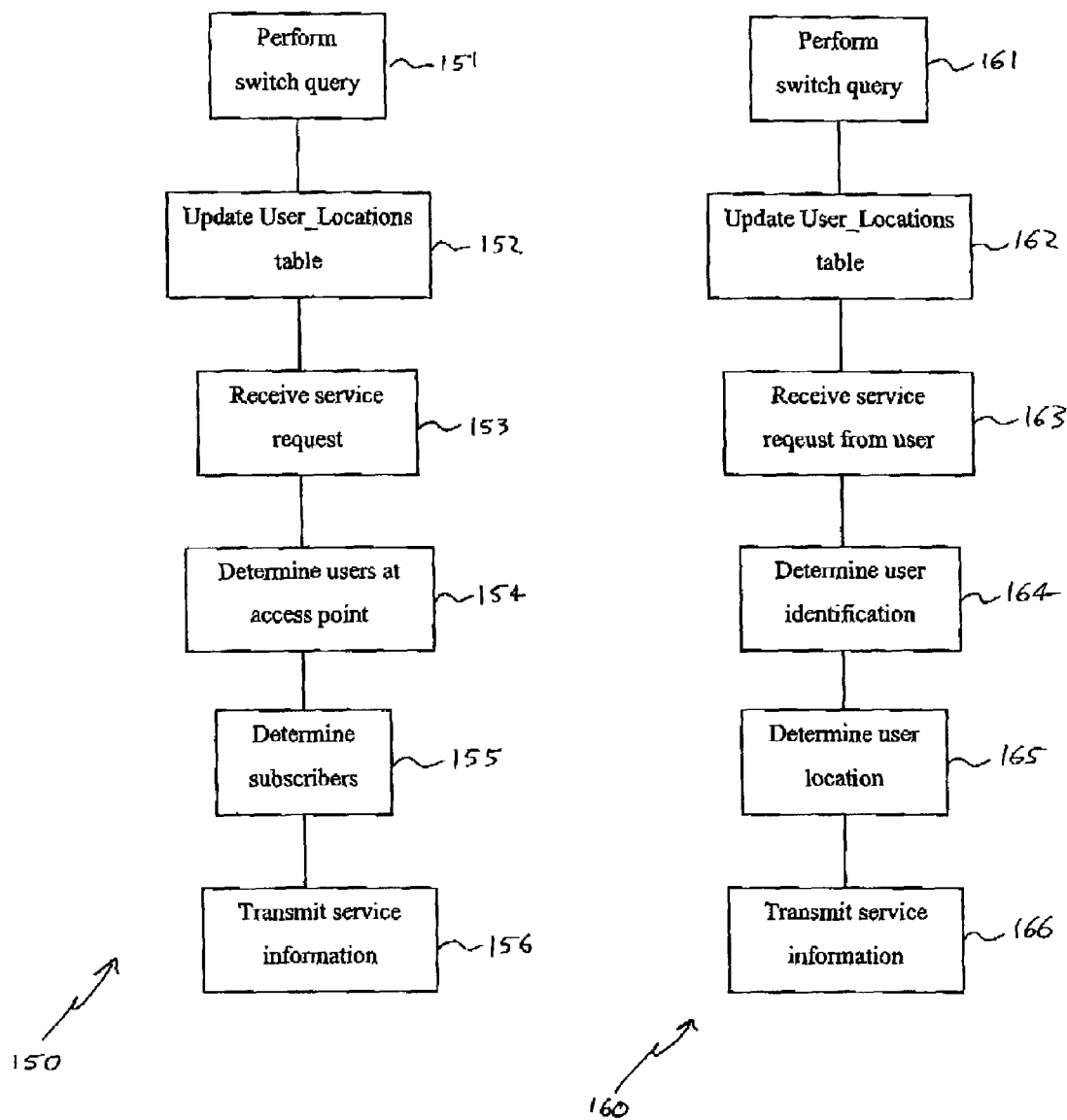
FIG. 15 provides a flowchart of the steps in providing a PUSH service to a user.
FIG. 16 provides a flowchart of the steps in providing a PULL service to a user.

FIG. 15 shows a flowchart 150 of steps in providing a PUSH service. Initially, a network switch query is performed 151 and the User_Locations table is updated 152. A scheduled PUSH service creates a request 153 to the User_Locations table to extract the identities of all users in proximity to a specified access point 154. The user identities are then used to determine 155 whether the relevant users are subscribers to the particular PUSH service request and those that are not are discarded from the list. An information signal containing the particular details of the PUSH service is then transmitted through the network in a known manner only to the relevant users 156.

FIG. 16 shows a flowchart 160 of steps in providing a PULL service. Initially, a network switch query is performed 161 and the User_Locations table is updated 162. A user requesting a PULL service generates a service request 163. The user identity is determined from the request message 164 after which the User_Locations table is accessed to determine the location of that user 165 and the PULL service information is transmitted through the user to the network 166.

The regular performance of the queries on the network switch queries and the updating of the User_Locations table runs as a software application on the network controller. The time interval between queries will be dependent on the system and environment in which the invention is implemented. For example, LANs having a high volume of traffic may require more regular updating than low volume networks. The update regularity may also depend on the types of location based services being provided.

The system may be configured such that the LAN cards of the network access devices provide a regular heartbeat signal, eg once every minute, that is transmitted into the network as a way of ensuring that the LAN devices within the LAN environment are active and thus the user locations are accurate.

The preferred embodiment described herein provides major benefits over other proposed solutions in that it is a network based software solution. The required information is extracted from the existing wireless network and thus there is little cost in implementing the invention and the WLAN users do not require additional hardware or software on their devices.

The solution further provides great flexibility because a user's location can be determined independent of the network provider and independent of the wireless device. As a result, this solution can be used in areas where there are multiple WLAN vendors at no extra cost to the operator or the user.

A user may possess more than one network access device eg a laptop and a mobile browser. All MAC addresses for these devices are stored in the User_Profiles table. Where two devices of a user are identified as being active on the network switch at different access points, the persistence of one device in favour of the other in subsequent switch queries can determine the user's location.

The above described preferred embodiments predominantly use the MAC addresses of the network access devices to determine user location. However in other embodiments, other device identities and devices other than active LAN communications devices may be used to locate users. In an appropriately configured network, the use of devices such as smart cards, electronic transaction cards (eg credit cards, debit cards) etc at a compatible device reader can be used to identify the user within a network and provide a more current indication of a user's location, in particular where a LAN communications device has been inactive. Location based services can then be provided to a communications enabled network access device owned by the user. In this regard, there may be an overlap in coverage of access points, in particular of different access point types. A user who is located in an area by a non-communications network access device, such as an electronic transaction card, may then receive a location based service on a communications enabled network access device, the service being provided through an access point overlapping the area of the access point in which the user has been located by their non-communications device.

The User_Profiles table can be used to store identities of all devices that may be used to locate a user within the LAN environment.

Figure 17:
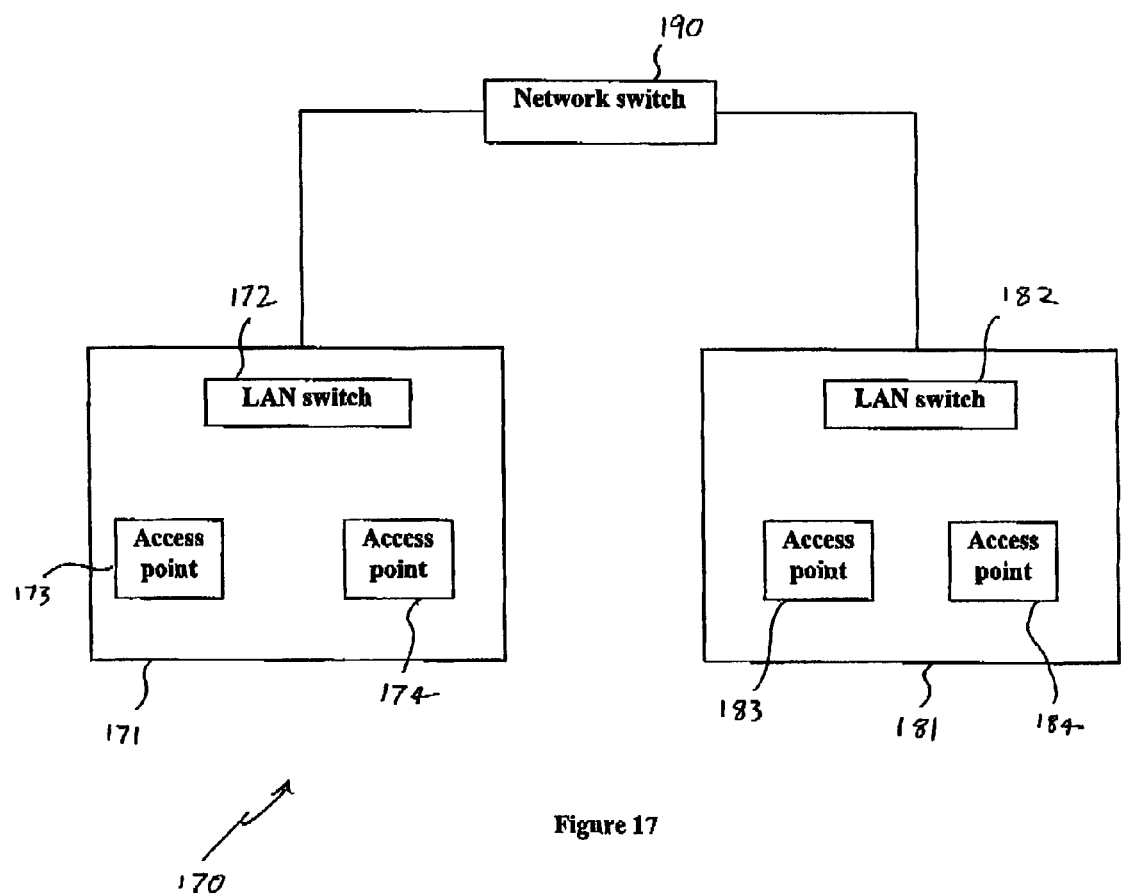
FIG. 17 shows a hierarchical network structure.

The above described WLAN embodiments have been described as self contained networks. In a further embodiment, such WLANs may form a node of a greater communications network. Referring to FIG. 17, a network 170 comprises a plurality of LANs 171, 181 such as of the type described above, each having their respective LAN switch 172, 182 to which are connected access points 173-174 and 183-184 respectively. The LAN switches 172, 182 are interconnected through a network switch 190. The network 170 may be viewed as a hierarchical structure with the network switch 190 forming a parent switch to the individual LAN switches 172, 182. The network switch 190 may in turn form a daughter switch to a parent network switch (not shown) further up the hierarchical network structure.

Network switch queries of the type described herein may be conducted on the parent switch 190. The query output will reveal not only the MAC addresses of the LAN switches 172, 182 and the port numbers to which those switches are connected on the parent switch 190, but also the access points, 173-174 and 183-184 active on their respective LAN switches. Further, the MAC addresses of any network access devices active on the access points will also be revealed.

The LANs represent a geographical area divided into smaller regions by the access points. Queries on the parent switch can locate a user to within a particular LAN. Subsequent queries on the determined LAN switch can pinpoint the user to an access point.

It will be appreciated by the person skilled in the art that numerous modifications and/or variations may be made to the present invention as shown in the specific embodiments without departing from the spirit or scope of the invention as defined in the claims that follow. The present embodiments are, therefore, to be considered in all respects to be illustrative and not restrictive and all such modifications and/or variations are intended to be embraced herein.

The invention claimed is:

1. In a network in which a plurality of geographically distributed network access points are connected to a plurality of ports of a network switch, a method of determining the location of a wireless network access device comprising:

performing a plurality of time spread queries on each one of a plurality of ports of said network switch, said plurality of queries producing a query output;

processing said query output to determine the persistence of said wireless network access device on each one of the plurality of ports;

utilising the persistence of said wireless network access device to determine the network port on which said wireless network access device is most active; and determining an approximate location of said wireless network access device from the geographic location of an access point corresponding with said determined port.

2. A method according to claim 1 further comprising determining a device identity of said wireless network access device, wherein said step of processing said query output determines a port on which said device identity is active.

3. A method according to claim 2 wherein the device identity is a Medium Access Control (MAC) address.

4. A method according to claim 1 wherein said one or more queries comprises a first query to determine the wireless network access devices active on said network switch and a second query to determine a port identity, wherein the outputs of said first and second queries are correlated to determine on which ports said active wireless network access devices are active.

5. A method according to claim 1 wherein said one or more queries comprise network management queries.

6. A method according to claim 5 wherein said one or more queries comprise Simple Network Management Protocol (SNMP) queries.

7. A method according to claim 1 further comprising storing, in a network database, a User_Locations table comprising a table of user and/or device locations produced from said one or more queries.

8. In a network in which a plurality of geographically distributed network access points are connected to a plurality of ports of a network switch, a method of determining the location of a user comprising:

determining a device identity of a wireless network access device corresponding to said user;

performing a plurality of time spread queries on a plurality of ports of said network switch, said one or more queries producing a query output;

processing said query output to determine the persistence of said wireless network access device on a port on which said wireless network access device is most active; and determining an approximate location of said wireless network access device from the geographic location of the access point corresponding with said determined port; thereby determining an approximate location of said user.

9. In a network in which a plurality of geographically distributed network access points are connected to a plurality of ports of a network switch, a method of delivering information to a user in proximity to a selected one of said access points, said method comprising:

performing a plurality of time spread queries on each one of a plurality of ports of said network switch to determine which said selected access point is connected, said queries producing a query output;

processing said query output to determine the persistence of a wireless network access device on each one of the plurality of ports to determine on which port the wireless network access device is most active; and determining a device identity of said wireless network access device active on said determined network port;

correlating said determined device identity with a device user;

determining an approximate location of said wireless network access device from the geographic location of the access point corresponding with said determined port; thereby determining an approximate location of said user; and transmitting information through said network to a communications enabled wireless network access device of said user, wherein the information is related to the approximate location of said user.

10. A method according to claim 9 further comprising storing device location data; and accessing said stored device location data to determine the wireless network access devices to which said information is to be transmitted.

11. A method according to claim 9 further comprising determining if a user corresponding to a device identity active on said selected port is a subscriber of said information.

12. A method according to claim 11 wherein said step of determining if a user corresponding to a device identity active on said selected port is a subscriber of said information comprises accessing a stored profile of said user.

13. In a network in which a plurality of geographically distributed network access points are connected to a plurality of ports of a network switch, a method of delivering information to a user, said method comprising:

determining a device identity of a wireless network access device corresponding to said user;

performing a plurality of time spread queries on each one of a plurality of ports of said network switch, said plurality of queries producing a query output;

processing said query output to determine the persistence of the wireless network access device on each of the plurality of ports to determine a port on which said wireless network access device is most active; and determining an approximate location of said wireless network access device from the geographic location of the access point corresponding with said determined port; thereby determining an approximate location of said user; and transmitting location dependent information to a communications enabled wireless network access device of said user through said network.

14. A program stored on a computer readable medium executable in a network in which a plurality of geographically distributed network access points are connected to a plurality of ports of a network switch, said program for performing a method of determining the location of a wireless network access device comprising:

performing a plurality of time spread queries on each one of a plurality of ports of said network switch, said plurality of queries producing a query output; and processing said query output to determine the persistence of said wireless network access device on each of the plurality of ports to determine a port on which said wireless network access device is most active;

determining an approximate location of said wireless network access device from the geographic location of an access point corresponding with said determined port.

15. A network comprising a network switch; a plurality of geographically distributed network access points connected to a plurality of ports of said network switch; and processing means; wherein said processing means is adapted to perform a plurality of time spread queries on each one of a plurality of ports of said network switch, said plurality of queries producing a query output; wherein said processing means is further adapted to process said query output to determine the persistence of a wireless network access device on each one of the plurality of ports to determine a port on which said wireless network access device is most active; and wherein said processing means is further adapted to determine an approximate location of said wireless network access device from the geographic location of an access point corresponding with said determined port.

16. A network node for use in a communications network, the node comprising a node switch having a plurality of ports connectable in use to a plurality of geographically distributed network access points; and processing means; wherein said processing means is adapted to perform a plurality of queries on each one of the plurality of ports of said node switch, said plurality of queries producing a query output; wherein said processing means is further adapted to process said query output to determine the persistence of a wireless network access device on each one of the plurality of ports to determine the port on which said wireless network access device is most active; and wherein said processing means is further adapted to determine an approximate location of said wireless network access device from the geographic location of an access point corresponding with said determined port.

17. In a network in which a plurality of geographically distributed network access points are connected to a plurality of ports of a network switch, a method of determining the location of a wireless network access device having an associated universal device identifier, said method comprising:

performing a plurality of time spread queries on each one of a plurality of ports of said network switch, said plurality of queries producing a query output incorporating universal device identifier data;

processing said query output to determine the persistence of the wireless network access device on each one of the plurality of ports to determine the port on which said wireless network access device is most active; and determining an approximate location of said wireless network access device from the geographic location of an access point corresponding with said determined port.

18. In a network in which a plurality of geographically distributed network structures are connected to a plurality of ports of a network switch, a method of determining the location of a wireless network access device active through said connected network structures, said method comprising:

performing a plurality of time spread queries on each one of a plurality of ports of said network switch, said one or more queries producing a query output;

processing said query output to determine the persistence of said wireless network access device on each one of the plurality of ports to determine the port on which said wireless network access device is most active; and determining an approximate location of said wireless network access device from the geographic location of a network structure corresponding with said determined port.

19. A method according to claim 18 wherein said network structures comprise node switches.

20. A method according to claim 18 wherein said network structures comprise network access points.

21. In a network in which a plurality of geographically distributed network structures are connected to a plurality of ports of a network switch, a method of determining the identity of a wireless network access device active through a selected one of said network structures, the method comprising:

performing a plurality of time spread queries on each one of a plurality of ports of said network switch to which said selected network structure is connected, said query producing a query output, and processing said query output to determine the persistence of the wireless network access device on each one of the plurality of network ports to determine on which of the plurality of ports the wireless network access device is most active; and further determining a device identity of the wireless network access device active on said determined network port; and determining an approximate location of said wireless network access device from the geographic location of a network structure corresponding with said determined port.

\* \* \* \* \*